United States Patent [19]
Ezaki et al.

[11] Patent Number: 5,142,121
[45] Date of Patent: Aug. 25, 1992

[54] METHOD FOR TERMINATING CABLES AND APPARATUS THEREFOR

[75] Inventors: Satoru Ezaki; Kiyofumi Tanaka, both of Hadano, Japan

[73] Assignee: Hitachi, Ltd., Tokyo, Japan

[21] Appl. No.: 585,404

[22] Filed: Sep. 20, 1990

[30] Foreign Application Priority Data

Sep. 21, 1989 [JP] Japan .................. 1-245450

[51] Int. Cl.⁵ ............................................. B23K 26/00
[52] U.S. Cl. ............................ 219/121.85; 174/107
[58] Field of Search .................. 219/121.68, 121.69, 219/121.85; 81/9.51; 174/107

[56] References Cited

U.S. PATENT DOCUMENTS

| | | | |
|---|---|---|---|
| 2,636,408 | 4/1953 | Mitchell | 81/9.51 |
| 4,261,231 | 4/1981 | Bleakley | 81/9.51 |
| 4,345,352 | 8/1982 | de Givry | 81/9.51 |
| 4,561,428 | 2/1985 | Ishitobi | 174/107 |
| 4,740,668 | 4/1988 | Perez | 219/121 PC |
| 4,761,535 | 4/1988 | Lawson | 219/121.68 |
| 4,861,945 | 8/1985 | Buck et al. | 174/69 |

*Primary Examiner*—C. L. Albritton
*Attorney, Agent, or Firm*—Fay, Sharpe, Beall, Fagan, Minnich & McKee

[57] ABSTRACT

According to the method for terminating a cable and the apparatus used therefor of the present invention, first the thermosetting resin layer of the cable is heat-cured, for example, by laser beam. The heat-cured thermosetting resin layer is lowered in stress and strain at rupture and hence can be easily cut and then this thermosetting resin layer is cut and peeled off.

8 Claims, 9 Drawing Sheets

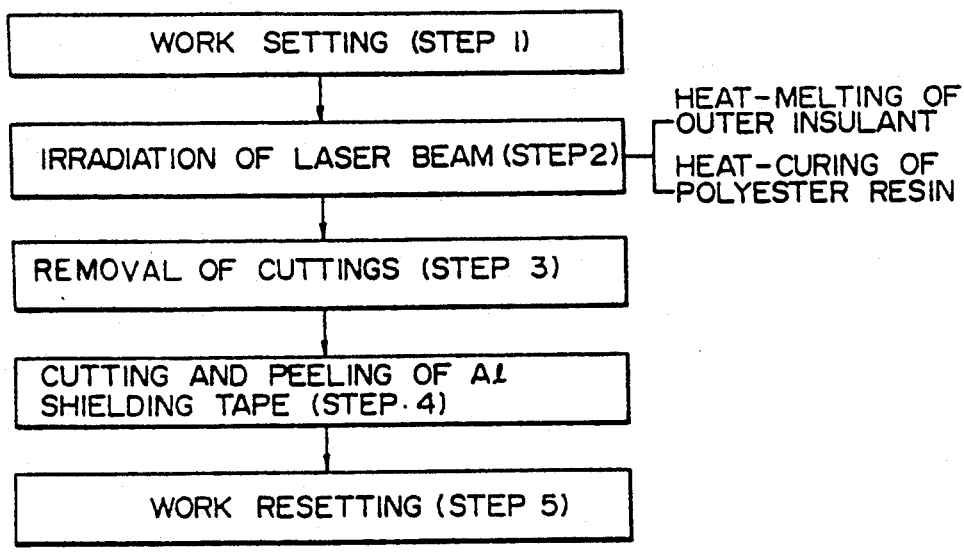
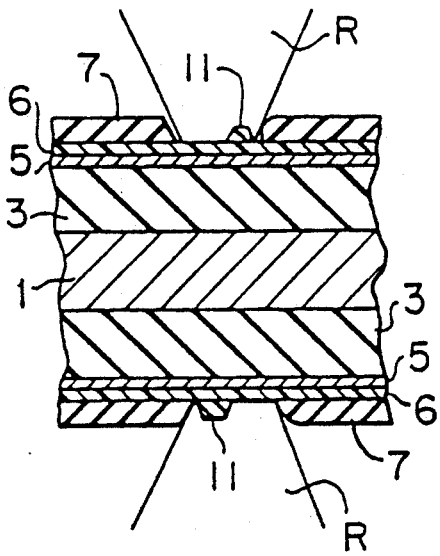
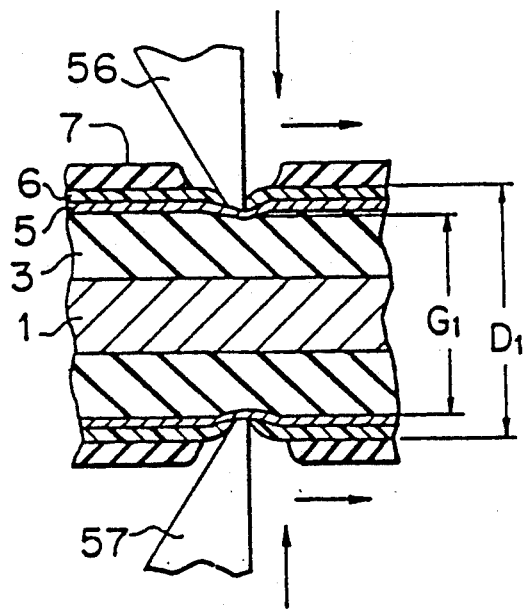

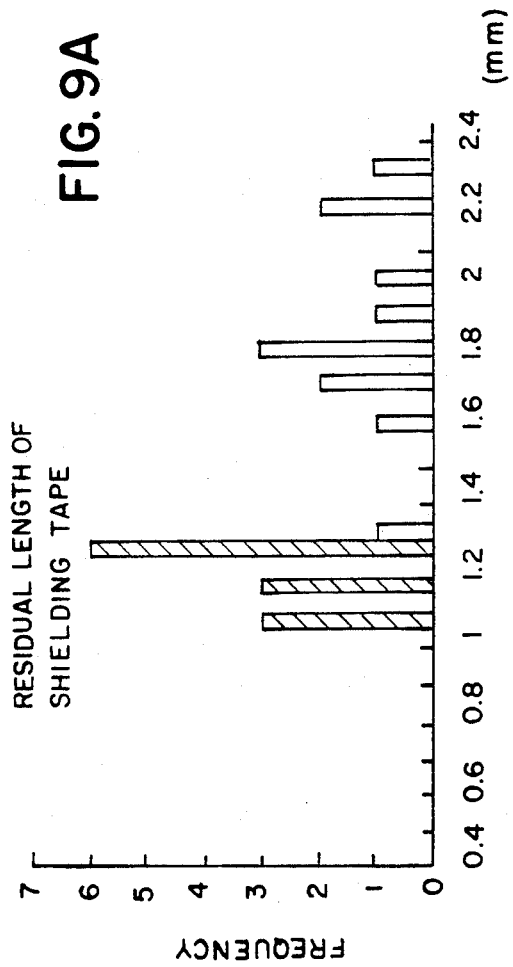
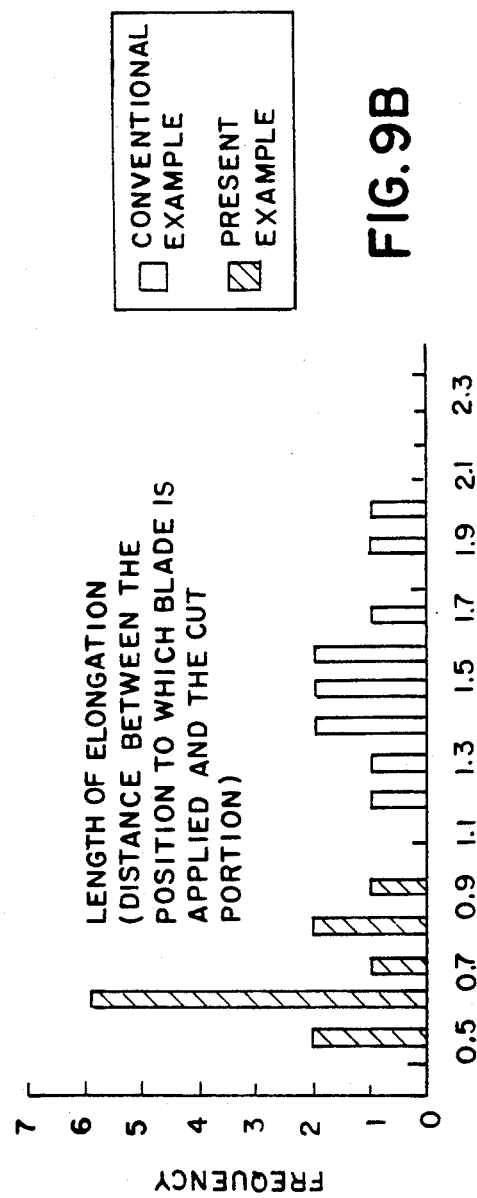

METHOD FOR TERMINATING CABLES AND APPARATUS THEREFOR

BACKGROUND OF THE INVENTION

The present invention relates to a method for terminating a cable having a thermosetting resin layer and an apparatus used for the termination of cable Construction of cable will be explained prior to explanation of conventional techniques.

As shown in FIG. 12 and FIG. 13, cable 10 is formed of signal wire 1 and ground wire 2 in pairs and a plurality of them are arranged in parallel.

Signal wire 1 is covered with inner foamed insulant 3 for improvement of signal propagation and due to limitation in impedance characteristics.

Ground wire 2 is provided adjacent to signal wire 1 covered with inner foamed insulant 3 and this ground wire 2 and signal wire 1 together are wound and covered with Al shielding tape 4 and are further covered with outer insulant 7 formed of fluororesin (FEP) which is a thermoplastic resin.

Al shielding tape 4 generally comprises Al foil 5 coated with polyester resin 6 which is a thermosetting resin on outer surface thereof.

One method for terminating such cable is disclosed, for example, in Japanese Patent Kokai No. 62-58809.

According to the above conventional technique, outer insulant is cut and peeled by a jacket peeling blade to expose Al shielding tape 4 and then, Al shielding tape 4 is cut and peeled by a tape peeling blade 8 having a specific flat portion formed on the end portion as shown in FIG. 14 and FIG. 15 for decreasing damage of inner foamed insulant 3.

The conventional method for terminating cables is superior in that inner foamed insulant 3 is not directly damaged by tape peeling blade, bus has the following problems.

That is, as shown in FIG. 17, in order to ensure insulation in connecting conductor 9a on substrate 9 with cable 10, insulation spacing Lb between terminal 4a of Al shielding tape 4 and terminal 9b of conductor 9a must be kept at more than a certain value. According to conventional technique, the flat part of tape peeling blade 8 is pressed to Al shielding tape 4 to tear off tape 4 and so residual length La which is the length between terminal 7a of outer insulant 7 and terminal 4a of Al shielding tape 4 is large as shown in FIG. 18 and besides, variation of the length is great and in some case the insulation space Lb cannot be sufficiently maintained.

Furthermore, as shown in FIG. 16, there are problems that fragments 4b of Al shielding tape are scattered owing to tearing off of Al shielding tape 4 and since tape peeling blade is pressed to Al shielding tape 4, inner foamed insulant 3 might be indirectly damaged and thus sufficient insulation cannot be ensured.

There are further problems that correction of terminal 4a of Al shielding tape 4 requires time due to variation of residual length of Al shielding tape 4 and besides, size of connector and the like provided at terminal portion of cable must be large considering variation of residual length.

Further problems are that size of flat portion of tape peeling blade 8 must be controlled and in addition, in order to cut inner foamed insulant 3 without severe damage thereof, minimum gap G between upper and lower tape peeling blades must be severely controlled and this is troublesome.

SUMMARY OF THE INVENTION

An object of the present invention is to solve the problems in the conventional technique and to provide a method for termination of cable according to which the residual length La is reduced and variation of the length La is decreased; flying of Al fragments is inhibited; damaging of inner foamed insulant is reduced, whereby sufficient insulation can be maintained; variation of the residual length is decreased to omit trouble for correction of terminal of Al shielding tape; and size of connector or the like connected to cable can be reduced and to provide an apparatus used for carrying out the method.

Another object of the present invention is to provide a method for termination of cable according to which control of flat portion of tape peeling blade and of minimum gap between upper and lower tape peeling blades is easy and termination can be easily performed and an apparatus used for carrying out the method.

The method for termination of cable for attaining the above objects of the present invention resides in a method for termination of cable having a thermosetting resin layer, characterized in that said thermosetting resin is cut and peeled after it has been heat cured.

When cable has a metal foil adjacent to inner surface of thermosetting resin layer, it is preferred to cut and peel this metal foil simultaneously with cutting and peeling of the thermosetting resin layer.

When cable has a thermoplastic resin layer adjacent to outer surface of the thermosetting resin layer, it is preferred to cut and peel the thermosetting resin after the thermoplastic resin is heat molten and simultaneously the thermosetting resin is heat cured. When the thermoplastic resin is heat molten, the thermosetting resin is preferably cut and peeled after fragments of molten thermoplastic resin have been removed.

The thermosetting resin can be heat cured by laser beam. When laser beam is applied to a cable having a metal foil adjacent to inner surface of thermosetting resin layer, the metal foil preferably has a reflectance of at least 90% for laser beam.

The apparatus for terminating a cable of the present invention resides in an apparatus for terminating a cable having a thermosetting resin layer, characterized by having a means for heat curing the thermosetting resin layer and a means for cutting and peeling the thermosetting resin layer.

The apparatus for terminating a cable may have a means for removing deposits adhering to the surface of the thermosetting resin layer.

The means for heat curing may be a means for irradiating the thermosetting resin layer with laser beam.

Furthermore, the means for cutting and peeling may comprise a peeling blade and the means for heat curing may comprise said peeling blade and a means for heating the peeling blade.

Moreover, the apparatus for terminating a cable preferably has a means for supporting the cable and simultaneously transferring the cable to the means for heat curing, the means for cutting and peeling and the means for removing deposits, if this is provided.

According to the terminating method of the present invention, first the thermosetting resin layer of cable is heat cured by the heat curing means.

When a thermoplastic resin layer is formed adjacent to the outer face of the thermosetting resin layer of the cable, a step of removing the thermoplastic resin by heat melting it by the heat of the heat curing means is carried out simultaneously with the step of heat curing a thermosetting resin and thus terminating process is simplified.

If thermosetting resin is carbonized by heat curing, since graphite produced by the carbonization is a good conductor, insulation of the resin decreases and so it is not preferred to heat the thermosetting resin until it carbonizes.

When the thermosetting resin is heat cured, stress and strain at the time of breaking markedly decrease and thus cutting of the resin becomes easy.

The heat cured thermosetting resin is cut and peeled by the cutting and peeling means.

Since the thermosetting resin becomes easy to cut, scattering of thermosetting resin at cutting and peeling can be inhibited and furthermore, elongation of cut portion of the thermoplastic resin which remains in the cable is small and variation of size can be made small.

Furthermore, since the thermosetting resin is easy to cut, control of flat part of peeling blade and control of minimum gap between upper and lower peeling blades can be easily performed.

BRIEF DESCRIPTION OF THE DRAWINGS

FIGS. 1-9 show the first example of the present invention.

FIG. 1 is a flow chart of termination of cable.

FIGS. 2 and 3 explain the state in each step for terminating cable.

FIG. 4 is a general oblique view of apparatus for termination of cable.

FIG. 5 is a general cross-sectional view of a unit for removal of cuttings.

FIG. 6 is a general side view of a unit for cutting of Al shielding tape.

FIG. 7 explains the state of cable after Al shielding tape has been cut and peeled off.

FIG. 8 is a graph which shows relation between stress and strain of Al shielding tape before and after heat curing.

FIGS. 9A and 9B are graphs which show state of distribution of residual length of the shielding tape and size of elongation of the shielding tape of various samples.

FIGS. 12 and 13 show construction of cable.

That is, FIG. 12 is a partial oblique view of cable.

FIG.

Figure 14:
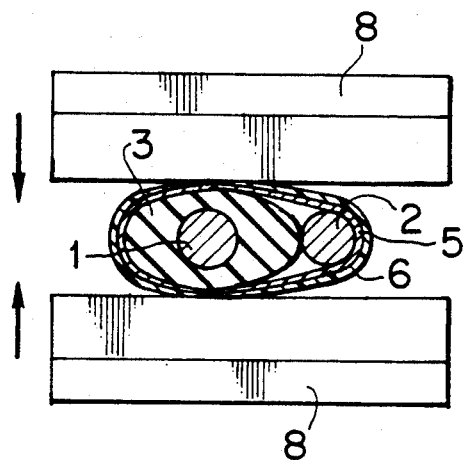
FIGS. 14-18 show conventional technique.
Figure 15:
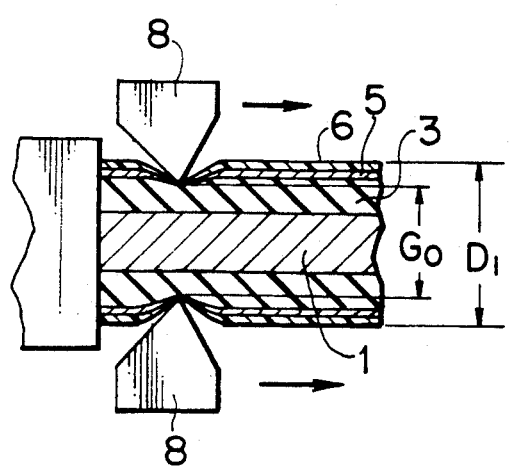
Figure 16:
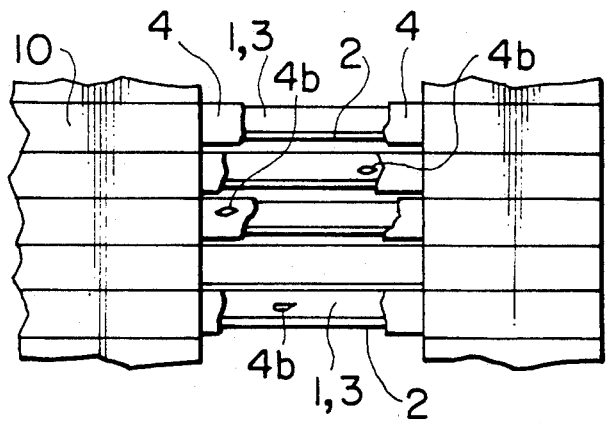

That is, FIGS. 14-16 explain state at each step in termination of cable.

Figure 17:
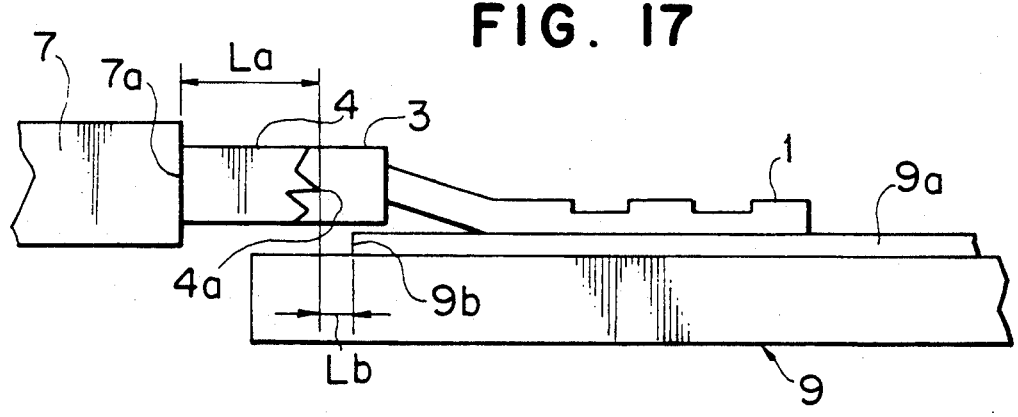

FIG. 17 is a side view which shows connection of cable to a substrate.

Figure 18:
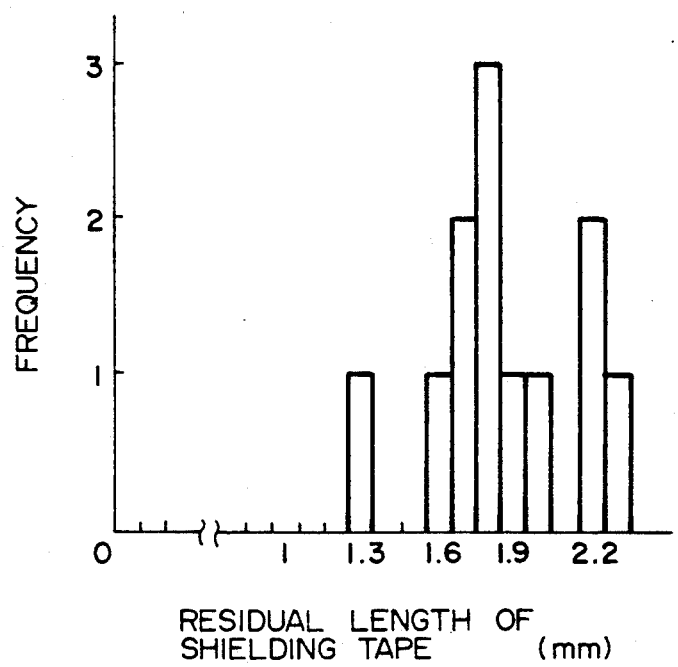

FIG. 18 is a graph which shows state of distribution of residual length of shielding tape of the samples.

DETAILED DESCRIPTION OF THE INVENTION

Various examples of the present invention will be explained referring to the drawings. In these examples and conventional techniques, the same reference number is used for the same part and repetition of explanation on the same parts is omitted.

The first example will be explained with reference to FIGS. 1-9.

Figure 4:
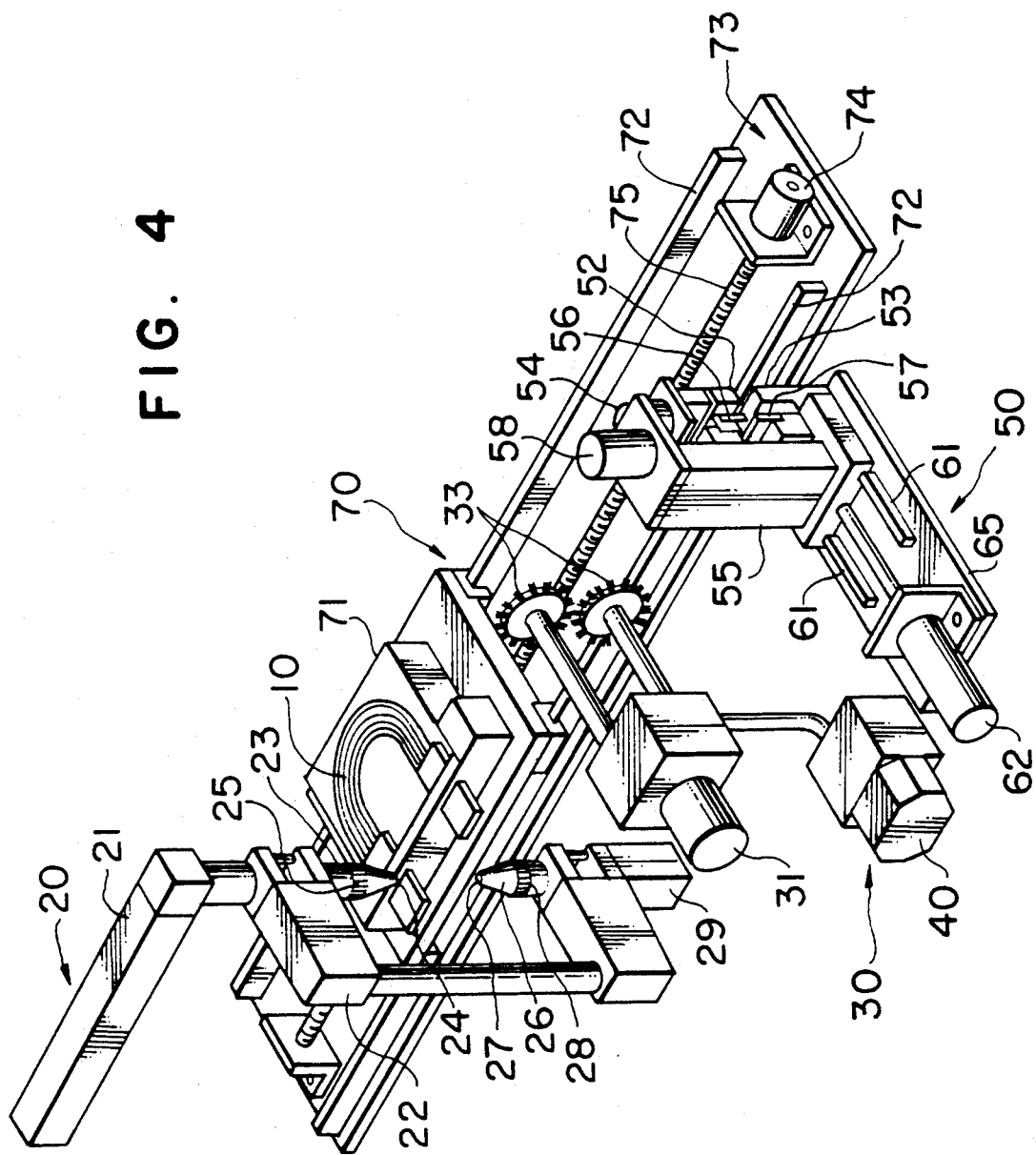

As shown in FIG. 4, the apparatus for terminating a cable comprises laser beam irradiation unit 20 for irradiating laser beam R to cable 10, cuttings removing unit 30 for removing cuttings of cable 10, Al shielding tape cutting unit 50 for cutting Al shielding tape 4, and table unit 70 for fixing cable 10 and transferring it to a desired position.

Laser beam irradiation unit 20 comprises laser beam emission part 21, optical branching part 22 provided with a half mirror for branching laser beam R from the laser beam emission part 21 into two directions, upper side irradiation optical part 23 for irradiating upper side of cable 10 with the branched laser beam R, lower side irradiation optical part 26 for irradiating lower side of cable 10 with the branched laser beam R, and branched laser beam output adjusting part 29 for adjusting output of laser beam R to be irradiated to the lower side of cable 10.

The laser beam emission part 21 has a function to adjust the output of laser beam R to be emitted.

Upper side irradiation optical part 23 and lower side irradiation optical part 26 are provided with irradiation lens 24 and irradiation lens 27 and spot diameter controlling diaphragms 25 and 28 for controlling beam spot diameter of laser beam R irradiated, respectively.

Laser beam R output from laser beam irradiation unit 20 is $CO_2$ gas laser for which Al foil 5 has a reflectance of 98%.

Figure 5:
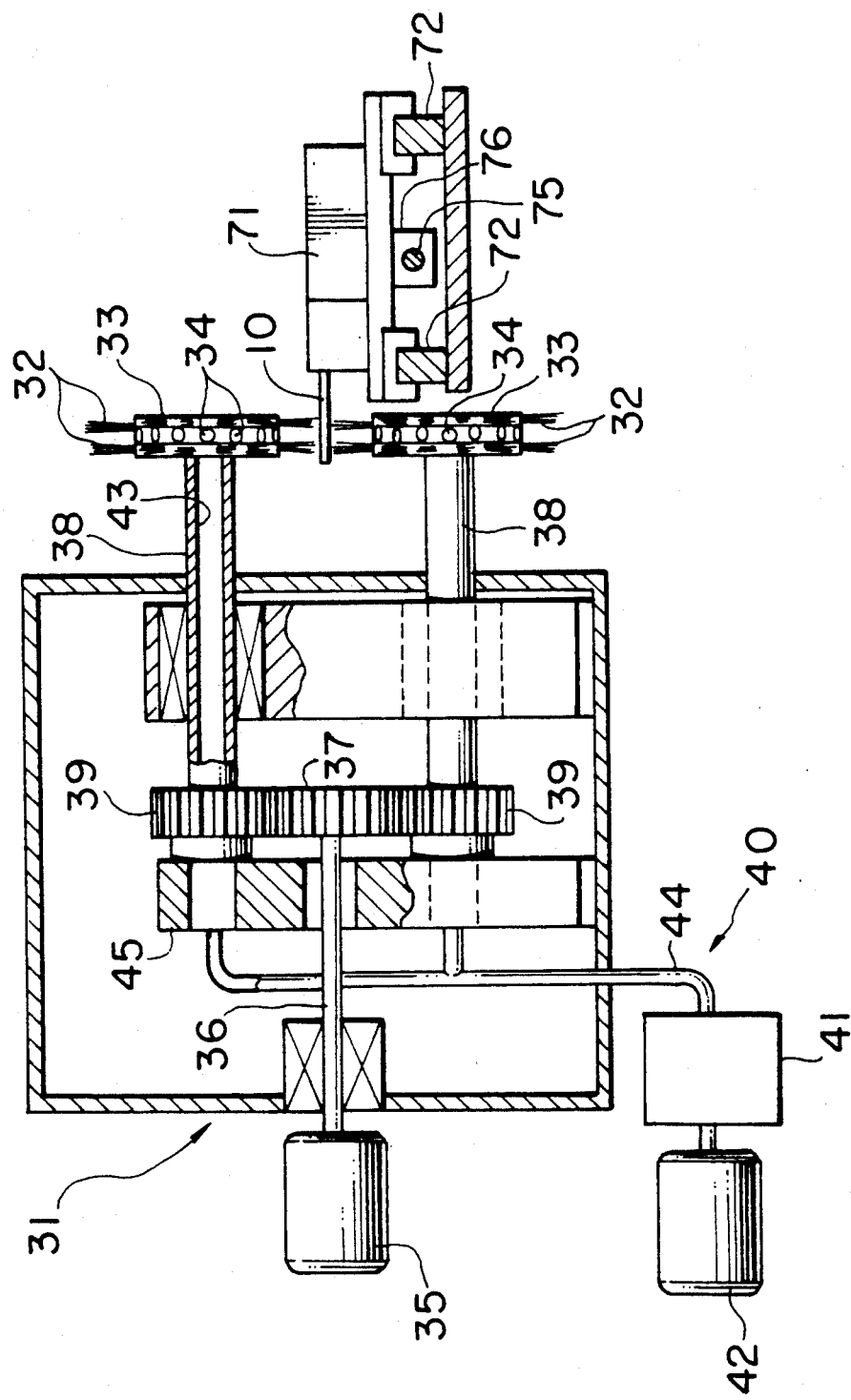

As shown in FIG. 5, cuttings removing unit 30 comprises a pair of upper and lower suction brushes 33 provided with a plurality of fillings 32 in radial form, brush driving part 31 for driving suction brushes 33, and cuttings suction part 40 which sucks cuttings of cable from a plurality of suction openings 34 made at base portion of suction brushes 33.

Brush driving part 31 is provided with brush driving motor 35 and driving gear 37 provided at the end of driving shaft 36 extending from brush driving motor 35 and suction brush gear 39 provided at the end of suction brush driving shaft 38 extending from a pair of upper and lower suction brushes 33 are engaged with each other so that a pair of upper and lower suction brushes 33 are driven and rotated by driving of brush driving motor 35.

Cuttings suction part 40 is provided with suction device 41 for sucking cuttings and suction motor 42 for driving suction device 41. Suction brush driving shaft 38 is a hollow shaft so that suction openings 34 of suction brushes 33 can communicate with suction device 41 and suction brush driving shafts 38 are connected through suction pipe 44 extending from suction device 41 and rotary coupling 45.

Figure 6:
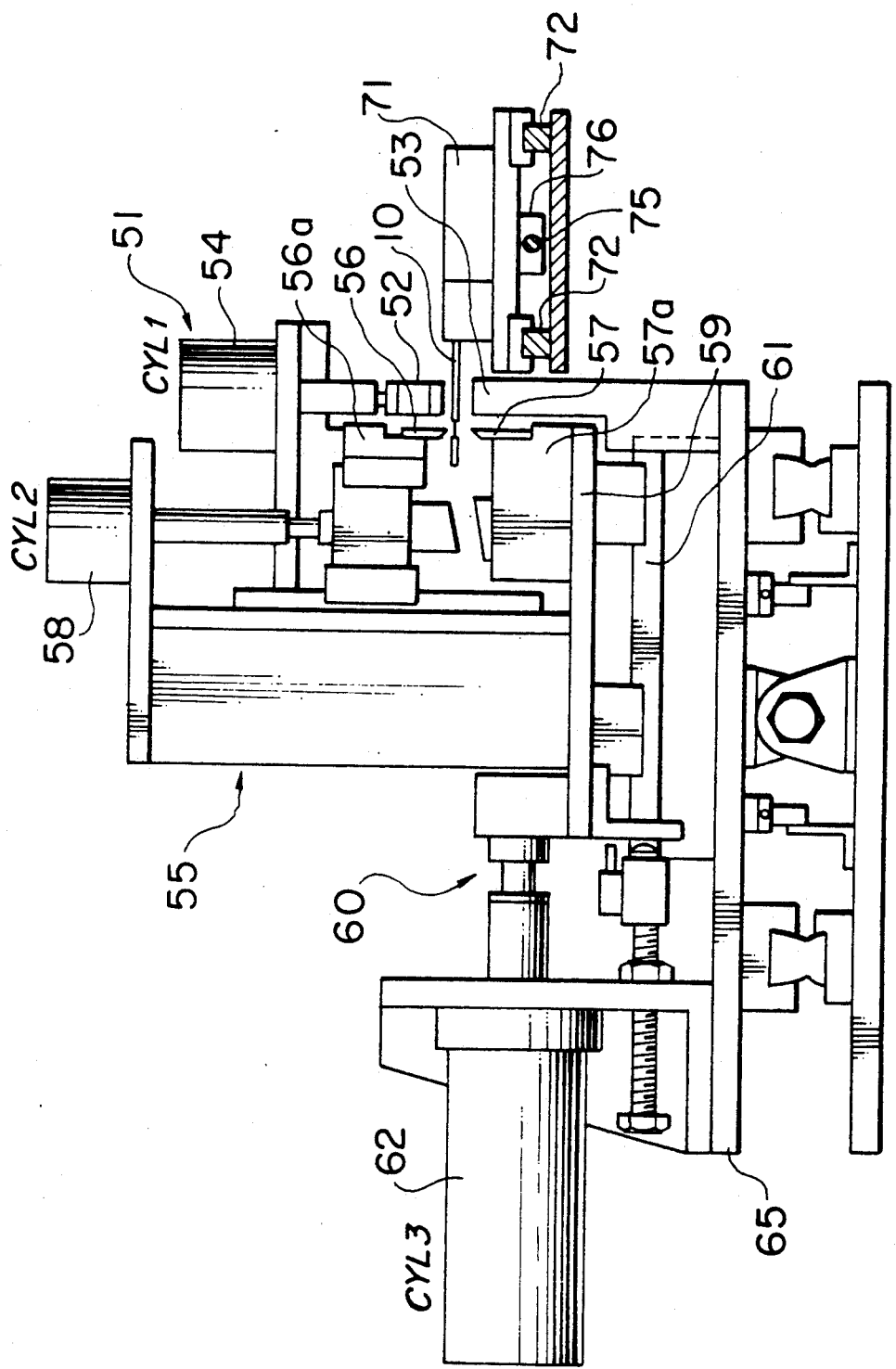

As shown in FIG. 6, Al shielding tape cutting unit 50 comprises cable supporting part 51 for supporting end portion of cable 10 for easy cutting of the cable, cutting and peeling part 55 for cutting and peeling Al shielding tape 4, peeling transferring part 60 for transferring cutting and peeling part 55 so as to peel off Al shield tape 4, and supporting base 65 which supports these parts.

Cable supporting part 51 is provided with upper pressing end 52 and lower pressing end 53 for supporting the end portion of cable 10 by pressing upwardly and downwardly and pressing end driving cylinder 54 for driving upper pressing end 52 upwardly and downwardly.

Cutting and peeling part 55 comprises a pair of upper and lower peeling blades 56, 57 for cutting and peeling Al shielding tape 4, die sets 56a, 57a for fixing peeling blades 56, 57, peeling blade driving cylinder 58 for driving upper die set 56a upwardly and downwardly, and table 59 for supporting them.

Cable supporting part 51 and cutting and peeling part 55 are laid on rails 61 provided on transferring part 60 and are provided so that they are driven to the direction of becoming remote from table unit 70 by transferring cylinder 62.

Table unit 70 comprises work pallet 71 which fixes cable 10 in the form of U, a pair of rails 72 which guide work pallet 71 so that it can move between laser beam irradiation unit 20 and Al shielding tape cutting unit 50 through cuttings removing unit 30, work pallet transferring part 73 which transfers work pallet 71 along rails 72, and a work pallet transfer controlling part not shown which controls work pallet transferring part 73.

Work pallet transferring part 73 is provided with work pallet transferring motor 74 and as shown in FIGS. 5 and 6, screw bolt 75 extending from work pallet transferring motor 74 is screwed into bolt member 76 fitted at lower part of work pallet 71 so that work pallet 71 is transferred by driving of work pallet transferring motor 71.

In this terminating apparatus for cable, laser beam irradiation unit 20 constitutes laser beam irradiation means, cuttings removing unit 40 constitutes deposit removing means, Al shielding tape cutting unit 50 constitutes cutting and peeling means, and table unit 50 constitutes cable transferring means.

Figure 12:
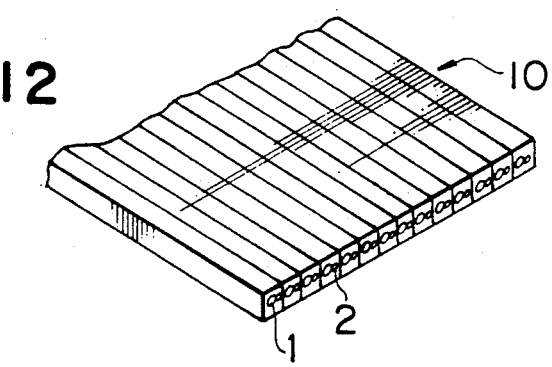
Figure 13A:
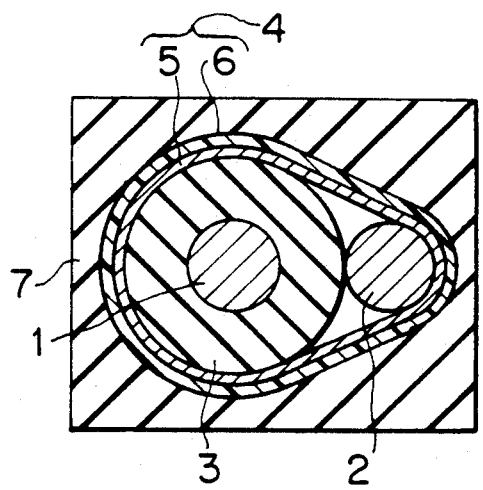
FIGS. 13A and 13B are partial cross-sectional views of cable.
Figure 13B:
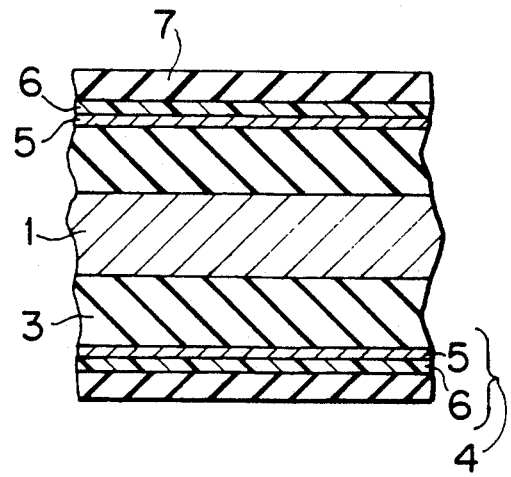

As mentioned above referring to FIGS. 12 and 13, the cable of this example is composed of signal wire 1, ground wire 2, inner foamed insulant 3, Al shielding tape 4 comprising Al foil 5 and polyester resin 6, and outer insulant 7.

Next, operation of this apparatus and method for termination of cable will be explained with reference to FIGS. 1–3 and FIG. 7.

Cable 10 to be terminated is set in the form of U on work pallet 71. (step 1).

Then, output of laser beam R emitted from laser beam emission unit Of laser beam irradiation unit 20 is adjusted and branched laser beam output adjusting part 29 is adjusted and output of laser beam R irradiated from upper irradiation lens 24 and that of laser beam R irradiated from lower irradiation lens 27 are balanced. Diaphragms 25 and 28 for spot diameter are controlled so that laser beams R can have proper beam spot for cable 10.

Work pallet transferring motor 74 is driven by instructions from work pallet transfer controlling part of table unit 70, thereby to transfer work pallet 71 so that the set cable 10 is positioned between upper irradiation lens 24 and lower irradiation lens 27.

When cable 10 comes between upper irradiation lens 24 and lower irradiation lens 27, laser beam emission part 21 is driven to irradiate cable 10 with laser beam R to heat-melt outer insulant 7 comprising fluororesin (FEP) which is a thermoplastic resin and simultaneously to heat-cure polyester resin 6 which is a thermosetting resin which constitutes Al shielding tape as shown in FIG. 2. (step 2).

In this case, reflectance, for laser beam R, of Al foil 5 is 98% and so laser beam R will never damage inner foamed insulant 3.

Figure 8:
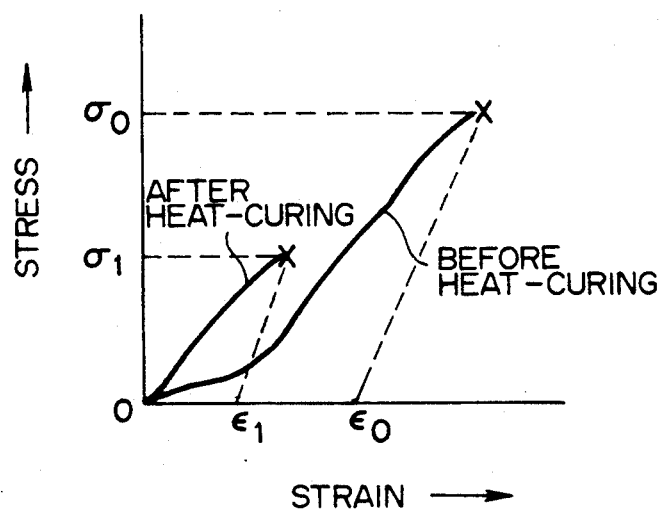

As shown in FIG. 8, stress and elongation at rupture of heat-cured Al shielding tape 4 become about $\frac{1}{3}$ and about $\frac{1}{4}$ times those of Al shielding tape 4 before heat-cured, respectively, and thus cutting and peeling of Al shielding tape 4 can be easily performed.

Next, work pallet transferring motor 74 is driven by the instructions from the work pallet transfer controlling part of table unit 70 to transfer work pallet 71 so that the portion of cable 10 irradiated with laser beam R comes between suction brushes 33 of cuttings removing unit 30.

As shown in FIG. 2, a part of outer insulant 7 heat-molten by laser beam R adheres onto Al shielding tape 4 as molten fragment 11, which causes formation of undesired resistance at the time of cutting and peeling of Al shielding tape and besides has a large influence on measurement of pitch of signal wire 1. Thus, the molten fragments must be removed.

This molten fragment 11 is removed from cable 10 by driving cuttings removing unit 30. (step 3).

Suction brushes 33 of cuttings removing unit 30 are rotated by brush driving motor 35 to scrape molten fragment 11 on cable 10. Scraped molten fragment 11 is sucked from suction opening 34 of suction brushes 33 into suction device 41 through suction brush driving shafts 38, rotary coupling 45 and suction pipe 44.

Work pallet transferring motor 74 is driven by the instructions from the work pallet transfer controlling part of table unit 70 to transfer work pallet 71 so that the portion of cable 10 irradiated with laser beam R comes between peeling blades 56, 57 of Al shielding tape cutting unit 50.

Upper pressing end 52 is driven by pressing end driving cylinder 54 of Al shielding tape cutting unit 50 and end portion of cable 10 is nipped and fixed between upper pressing end 52 and lower pressing end 53.

As shown in FIG. 3, upper peeling blade 56 is downwardly moved by peeling blade driving cylinder 58 to set at a desired value the minimum gap size $G_1$ which is the minimum distance between peeling blade 56 and peeling blade 57 and a pair of the upper and lower peeling blades 56, 57 are transferred by peeling and transferring cylinder 62 to cut and peel Al shielding tape 4. (step 4).

Figure 7:
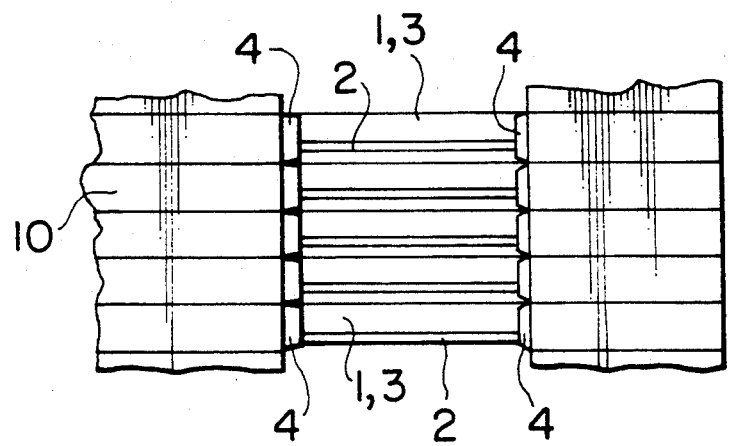

As mentioned above, stress at rupture and elongation at rupture of the heat-cured Al shield tape 4 are about $\frac{1}{3}$ and about $\frac{1}{4}$ times those of Al shielding tape 4, respectively, before heat-cured and cutting and peeling of the heat-cured Al shielding tape 4 are easy. Therefore, as shown in FIG. 7, fragments 5a of Al shielding tape 4 are not scattered and as shown in FIG. 9, residual length La of Al shielding tape 4 becomes short and variation of La becomes small and thus, insulating space Lb shown in FIG. 17 can be certainly ensured. FIGS. 9A and 9B show residual length La and length of elongation of Al shielding tape 4 according to this example and furthermore, for comparison, residual length La and length of elongation of Al shielding tape 4 according to conventional method of termination of cable.

Furthermore, since the minimum gap size $G_1$ can be increased, damage of inner foamed insulant 3 can be reduced. Besides, scope of permissible error of minimum gap size $G_1$ can be increased and thus control of minimum gap size $G_1$ can be easily performed.

When termination of cable 10 is completed, cable 10 is removed from work pallet 71 (step 5) and cable 10 is connected to connector or substrate 9.

In this Example, the shielding tape is composed of Al foil and polyester resin, but other metal foils may be used in place of Al foil and resins other than polyester resins may be used as far as they are thermosetting resins.

Moreover, the outer insulant of cable may be formed of resins other than thermoplastic resins and in this case, it is preferred to carry out termination of the cable by cutting and peeling the outer insulant by peeling blade and irradiating with laser beam.

The cable in this Example is one which is generally called a flat coaxial multi-core cable, but any cables can be terminated by the method of the present invention as far as they have a thermoplastic resin layer.

As cable transferring means, industrial robots called manipulator may be used in place of table unit.

Next, the second example of the present invention will be explained referring to FIGS. 10 and 11.

The apparatus for termination of cable of this example comprises fundamentally the same parts as in the first example except that the heat-curing means is composed of upper and lower peeling blades 56, 57 and peeling blade heating means for heating upper and lower peeling blades 56, 57 in place of laser beam irradiation unit 20 in the first example.

The peeling blade heating means has heating wires 81, 82 coiled around upper and lower peeling blades 56, 57, respectively, and a current source not shown which supplies current to heating wires 81, 82 and can control current quantity.

Method of termination using the apparatus of this example will be explained.

First, current is supplied to heating wires 81, 82 from current source to heat heating wires 81, 82 and upper and lower peeling blades 56, 57.

Figure 10:
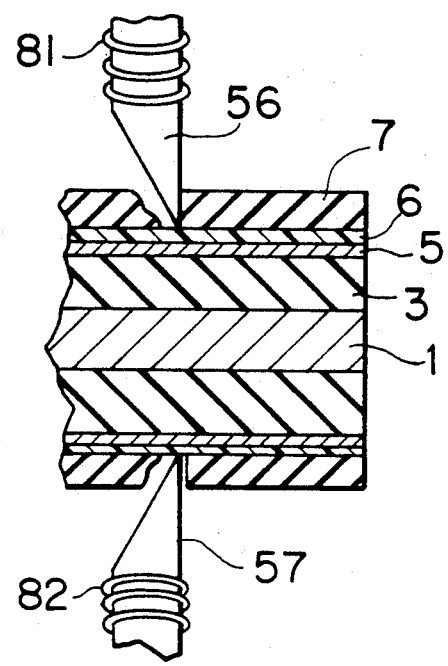
FIGS. 10 and 11 show state at each step in termination of cable in the second example.
Figure 11:
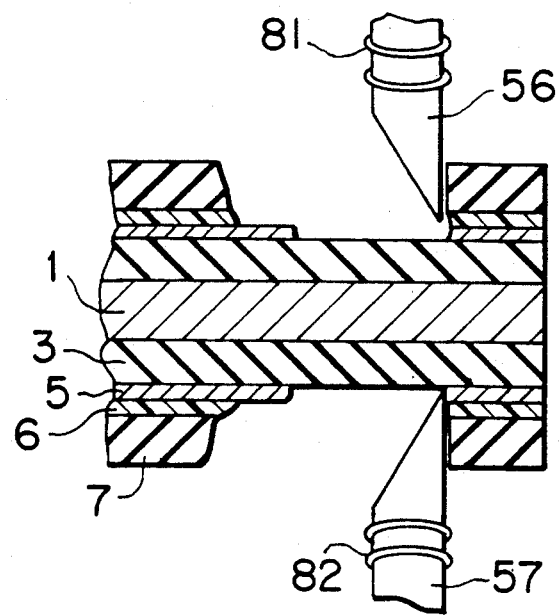

As shown in FIG. 10, outer insulant 7 is heatmolten and simultaneously polyester resin 6 is heatcured by reducing the distance between upper and lower peeling blades 56, 57. As shown in FIG. 11, the upper and lower peeling blades 56, 57 in this state are transferred in parallel to cut and peel off Al shielding tape 4.

According to this example, not only the same effect as in the first example is exhibited, but also miniaturization of apparatus can be attained and production cost for the apparatus can be reduced since laser beam irradiation unit is not required.

What is claimed is:

1. A method for terminating a cable, the cable comprising a signal wire, an inner sealant surrounding the signal wire, and a metal shielding tape comprising metal foil ad thermosetting resin, the metal foil located adjacent an inner surface of the thermosetting resin, the method comprising the steps of:
   heating the cable, thereby heat-setting the thermosetting resin;
   cutting the metal shielding tape; and,
   peeling the metal shielding tape from the cable.

2. A method for terminating a cable, the cable comprising a signal wire, a ground wire, an inner sealant surrounding the signal wire, and a metal shielding tape comprising metal foil and thermosetting resin, the metal foil located adjacent an inner surface of the thermosetting resin, and a thermoplastic resin adjacent an outer surface of the thermosetting resin, the method comprising the steps of:
   heating the cable, thereby heat-melting the thermoplastic resin and heat-setting the thermosetting resin;
   cutting the metal shielding tape from the cable; and;
   peeling the metal shielding tape from the cable.

3. The method according to claim 1 wherein the metal foil has a reflectance of at least 90%, when the heating is carried out by a laser beam.

4. The method according to claim 1 wherein the metal foil of the metal shielding tape is an aluminum foil.

5. The method according to claim 4 wherein the heating is continued until the metal shielding tape has a stress and an elongation at rupture of between $\frac{1}{3}$ and $\frac{1}{4}$ times said stress and elongation before such heating.

6. The method according to claim 2 wherein the metal foil has a reflectance of at least 90%, when the heating is carried out by a laser beam.

7. The method according to claim 2 wherein the metal foil of the metal shielding tape is an aluminum foil.

8. The method according to claim 4 wherein the heating is continued until the metal shielding tape has a stress and an elongation at rupture of between $\frac{1}{3}$ and $\frac{1}{4}$ times said stress and elongation before such heating.

* * * * *